United States Patent
Ojala (10) Patent No.: US 7,627,236 B2
(45) Date of Patent: Dec. 1, 2009

(54) HYDRAULIC OPTICAL FOCUSING-STABILIZER

(75) Inventor: Kai Markus Ojala, Oulu (FI)

(73) Assignee: Nokia Corporation, Espoo (FI)

( * ) Notice: Subject to any disclaimer, the term of this patent is extended or adjusted under 35 U.S.C. 154(b) by 371 days.

(21) Appl. No.: 11/360,985

(22) Filed: Feb. 22, 2006

(65) Prior Publication Data
US 2007/0195424 A1 Aug. 23, 2007

(51) Int. Cl.
G03B 3/00 (2006.01)
G03B 5/00 (2006.01)
G03B 17/00 (2006.01)
G02B 1/06 (2006.01)
G02B 27/64 (2006.01)

(52) U.S. Cl. ............... 396/55; 396/85; 396/89; 359/557; 359/665

(58) Field of Classification Search ......... 359/665, 359/666, 557; 396/55, 85, 89
See application file for complete search history.

(56) References Cited

U.S. PATENT DOCUMENTS

| 3,455,221 | A | * | 7/1969 | Reekie .................. 396/55 |
| 4,600,275 | A | | 7/1986 | Iizuka |
| 4,840,473 | A | | 6/1989 | Kushibiki et al. .......... 999/484 |
| 5,134,468 | A | | 7/1992 | Ohmuro .................. 358/50 |
| 5,517,238 | A | * | 5/1996 | Hirasawa ............... 348/208.12 |
| 5,541,776 | A | * | 7/1996 | Kobayashi et al. ........ 359/665 |
| 5,589,239 | A | | 12/1996 | Tomono et al. .............. 428/34 |
| 5,684,637 | A | * | 11/1997 | Floyd .................. 359/666 |
| 5,796,531 | A | * | 8/1998 | Kaneda et al. ............. 359/832 |
| 5,973,852 | A | * | 10/1999 | Task .................. 359/666 |
| 7,054,053 | B2 | * | 5/2006 | Nishioka ............... 359/291 |
| 2003/0002867 | A1 | | 1/2003 | Ojala |
| 2006/0132614 | A1 | | 6/2006 | Lee et al. |
| 2006/0140610 | A1 | * | 6/2006 | Chang .................. 396/89 |

FOREIGN PATENT DOCUMENTS

| EP | 1724635 A1 | 11/2006 |
| JP | 60 151603 A | 8/1985 |
| JP | 01227124 A. | 9/1989 |
| JP | 8114769 | 5/1996 |
| WO | WO2005083507 | 9/2005 |

OTHER PUBLICATIONS

European Search Report Communication (1 page), Supplementary European Search Report (2 pages) and European Search Opinion (3 pages), 6 pages total.

* cited by examiner

*Primary Examiner*—William B Perkey (57) ABSTRACT

The specification and drawings present a new method, apparatus and software product for optical focusing and stabilizing using a hydraulic component, called focusing stabilizer, in an image focusing module of the electronic devices. This focusing stabilizer is capable of doing focus adjustment and/or image stabilization. The focusing stabilizer can comprise two optical elements (e.g., two plates or prisms, two lenses, or one plate or prism and one lens) and a liquid between them. The refractive index and thickness of the liquid changes a length of the optical path from the object to the photosensitive surface such that the system focus shift depends on a liquid lens thickness in the direction of the optical axis. In addition, adjusting two optical components using a predetermined criterion provides a stabilization of the focused image.

28 Claims, 5 Drawing Sheets

Tele

Figure 4a

MID

Figure 4b

Wide

HYDRAULIC OPTICAL FOCUSING-STABILIZER

TECHNICAL FIELD

The present invention relates generally to electronic devices and, more specifically, to optical focusing and stabilizing using a hydraulic component in image focusing modules of the electronic devices.

BACKGROUND ART

Focusing and stabilization are important issues in electronic imaging devices. Focusing is traditionally done by moving the whole lens back and forth from the sensor or some lens groups in lens systems. More recently a liquid lens focuser system was introduced.

For example, PHILIPS FLUID/FOCUS system mimics the action of the human eye using a fluid lens that alters its focal length by changing its shape. The new lens, which lends itself to high volume manufacturing, overcomes the fixed-focus disadvantages of many of today's low-cost imaging systems. The lens consists of two immiscible (non-mixing) fluids of different refractive index (optical properties), one an electrically conducting aqueous solution and the other an electrically non-conducting oil, contained in a short tube with transparent end caps. The internal surfaces of the tube wall and one of its end caps are coated with a hydrophobic (water-repellent) coating that causes the aqueous solution to form itself into a hemispherical mass at the opposite end of the tube, where it acts as a spherically curved lens. The shape of the lens is adjusted by applying an electric field across the hydrophobic coating such that it becomes less hydrophobic—a process called "electro-wetting" that results from an electrically induced change in surface-tension. As a result of this change in surface-tension, the aqueous solution begins to wet the sidewalls of the tube, altering the radius of curvature of the meniscus between the two fluids and hence the focal length of the lens. Thus it is possible to implement lenses that transition smoothly from being convergent to divergent and back again.

Image stabilization recently has become very popular in digital still and video cameras. Stabilization is also traditionally done by moving the lens, the lens group or the image sensor. But more recently a "Built-in Image Stabilizer" technology developed by CANON also delivers shake-free performance. Functional from the moment it is turned on, the system employs a VARI-ANGLE prism, dual transparent plates, independent vertical and horizontal sensors and a dedicated microprocessor to continuously adjust the prism to maintain a steady image. The VARI-ANGLE prism technique uses two prism elements and as these elements rotate in response to sensed motion, they can offset the light path and thus correct for the image shift.

DISCLOSURE OF THE INVENTION

According to a first aspect of the invention, an image focusing module, comprises: at least one objective lens or a lens group, for collecting an optical image of an object; and a focusing stabilizer, wherein the collected optical image propagates through the focusing stabilizer and then is focused with a predetermined minimum image quality by the image focusing module on a photosensitive surface, the focusing stabilizer comprises: a first optical element, substantially perpendicular to an optical axis of the image focusing module; a second optical element, substantially perpendicular to an optical axis of the image focusing module; and a liquid inserted between the first and the second optical element, wherein an index of refraction of the liquid is larger than one and a thickness of the liquid along the optical axis is adjusted by moving the first or the second element along the optical axis to provide the predetermined minimum image quality.

According further to the first aspect of the invention, at least one element out of the first and the second elements may be adapted to move according to a predetermined criterion to provide a stabilization of the image focused on the photosensitive surface.

Further, the stabilization may be provided by tilting the at least one element relative to an axis perpendicular to the optical axis. Still further, the stabilization may be provided by moving the at least one element in a direction substantially perpendicular to the optical axis, wherein the at least one element has at least one lens-like surface.

Further according to the first aspect of the invention, the at least one element out of the first and the second elements may be a plate with flat surfaces or a prism.

Still further according to the first aspect of the invention, at least one element out of the first and the second elements may have at least one lens-like surface.

According further to the first aspect of the invention, at least one element out of the first and the second elements may be coated with antireflection coating.

According still further to the first aspect of the invention, the photosensitive surface may be an image sensor or a charge coupled device.

According further still to the first aspect of the invention, the thickness of the liquid along the optical axis may be adjusted to provide the predetermined minimum image quality for facilitating an auto-focus function or a zooming function.

According yet further still to the first aspect of the invention, the indexes of refraction of the liquid and the first and second optical elements may be substantially equal.

According to a second aspect of the invention, a method for focusing an image using an image focusing module, comprises the steps of: collecting an optical image of an object at least one objective lens assembly of the image focusing module; and propagating the collected image through a focusing stabilizer of the image focusing module and then focusing the image by the image focusing module on a photosensitive surface with a predetermined minimum image quality, the focusing stabilizer comprises: a first optical element, substantially perpendicular to an optical axis of the image focusing module; a second optical element, substantially perpendicular to an optical axis of the image focusing module; and a liquid inserted between the first and the second optical element, wherein an index of refraction of the liquid is larger than one and a thickness of the liquid along the optical axis is adjusted by moving the first or the second element along the optical axis to provide the predetermined minimum image quality.

According further to the second aspect of the invention, at least one element out of the first and the second elements may be adapted to move according to a predetermined criterion to provide a stabilization of the image focused on the photosensitive surface. Further, the stabilization may be provided by tilting the at least one element relative to an axis perpendicular to the optical axis. Further still, the stabilization may be provided by moving the at least one element in a direction substantially perpendicular to the optical axis, wherein the at least one element has at least one lens-like surface.

Further according to the second aspect of the invention, at least one element out of the first and the second elements may be a plate with flat surfaces or a prism.

Still further according to the second aspect of the invention, at least one element out of the first and the second elements may have at least one lens-like surface.

According further to the second aspect of the invention, at least one element out of the first and the second elements may be a prism.

According still further to the second aspect of the invention, the photosensitive surface may be an image sensor or a charge coupled device.

According further still to the second aspect of the invention, the thickness of the liquid along the optical axis may be adjusted to provide the predetermined minimum image quality for facilitating an auto-focus function or a zooming function.

According to a third aspect of the invention, a computer program product comprises: a computer readable storage structure embodying computer program code thereon for execution by a computer processor with the computer program code characterized in that it includes instructions for performing the steps of the first aspect of the invention, indicated as being performed by any component of an electronic device comprising the image focusing module.

According further to the fourth aspect of the invention, an electronic device comprises: an image focusing module, comprises: at least one objective lens or a lens group, for collecting an optical image of an object; and a focusing stabilizer, wherein the collected optical image propagates through the focusing stabilizer and then is focused with a predetermined minimum image quality by the image focusing module on a photosensitive surface, the focusing stabilizer comprises: a first optical element, substantially perpendicular to an optical axis of the image focusing module; a second optical element, substantially perpendicular to an optical axis of the image focusing module; and a liquid inserted between the first and the second optical element, wherein an index of refraction of the liquid is larger than one and a thickness of the liquid along the optical axis is adjusted by moving the first or the second element along the optical axis to provide the predetermined minimum image quality; at least one focus controller, for providing a focus control signal for adjusting the thickness of the liquid.

Further according to the fourth aspect of the invention, the electronic device may be a photographic camera, a digital camera, a video camera, an electronic imaging device, a portable device, a mobile electronic device or a camera-phone.

Still further according to the fourth aspect of the invention, the electronic device may further comprise: at least one stabilization sensor, for monitoring the movement of the electronic device and for providing a stabilization signal; and at least one stabilization driver, responsive to the stabilization signal, for providing a stabilization control signal to the focusing stabilizer. Further, in response to the stabilization control signal, at least one element out of the first and the second elements may be adapted to move according to a predetermined criterion to provide a stabilization of the image focused on the photosensitive surface.

MODES FOR CARRYING OUT THE INVENTION

A new method, apparatus and software product are presented for optical focusing and stabilizing using a hydraulic component in an image focusing module of the electronic devices. According to an embodiment of the present invention, the hydraulic component is a special optical component, a focusing stabilizer, added to optics in the image focusing module. This focusing stabilizer is capable of doing focus adjustment and/or image stabilization. The focusing stabilizer can comprise two optical elements (e.g., two plates or prisms, two lenses, or one plate or prism and one lens) and a liquid between them. If the optical element is located, for example, between an objective lens or a lens group, collecting an optical image of an object, and a photosensitive surface (e.g., a sensor, charge coupled device, photographic paper, etc.), the refractive index (for the liquid refractive index larger than one) and the thickness of the liquid changes a length of the optical path from the object to the photosensitive surface. So the system focus shift depends on a liquid lens thickness in the direction of the optical axis.

The liquid lens thickness can be controlled by amount of liquid between the two optical components such that the collected optical image from the object propagates through said focusing stabilizer and then is focused with a predetermined minimum image quality by the image focusing module on the photosensitive surface. Thus, the thickness of the liquid along the optical axis is adjusted (increased or decreased) by moving the optical elements relative to each other along the optical axis to provide the predetermined minimum image quality. Liquid volume adjustment can utilize a container and a pump mechanism. A container plunger can be also spring loaded for providing an adequate pressure to the liquid. The spring load and pressure can be controlled electrically. Thus the liquid thickness can be controlled by liquid pressure and/ or by the amount of liquid.

Image stabilization usually utilizes sensors for detecting camera movements. Sensor information is processed to calculate compensation movement which is needed for stabilization using, e.g., an electric or magnetic field, motors, inertia or other means.

According to an embodiment of the present invention, the compensation movement of at least one element of the optical elements can be (but is not limited to):

a) tilting the at least one of the optical elements relative to an axis perpendicular to the optical axis causing shifting the image on the photosensitive surface, wherein tilting by a small angle provides the required stabilization but has minuscule effect on the focus; and/or b) moving the at least one of the optical elements in a direction substantially perpendicular to the optical axis, wherein the at least one element or both elements has at least one lens-like surface, thus also causing the desired shifting of the image on the photosensitive surface.

It is noted that, according to further embodiments of the present invention, indexes of refraction of the liquid and the two optical elements can be substantially equal, which will minimize potential undesirable multiple reflections. Also, surfaces of the optical elements facing the air can be coated by the antireflection coating to minimize undesirable reflections. Moreover, the focusing stabilizer can facilitate auto-focus function and/or a zooming function. The electronic device with the focusing stabilizer, described by embodiments of the present invention, can be (but are not limited to): a photographic camera, a digital camera, a video camera, an electronic imaging device, a portable device, a mobile electronic device, a camera-phone, etc.

The advantages of the focusing stabilizer described by various embodiments of the present invention include (but are not limited to): a) combining image stabilization and focusing methods; b) reducing the camera module size (focusing does not require large lens movement); c) improving accuracy of focusing and stabilization; and d) using only one liquid.

The liquid used in the focusing stabilizer can be a silicon oil, water, alcohol, or any other liquid with suitable optical properties such as refractive index and optical transparency.

Figure 1A:
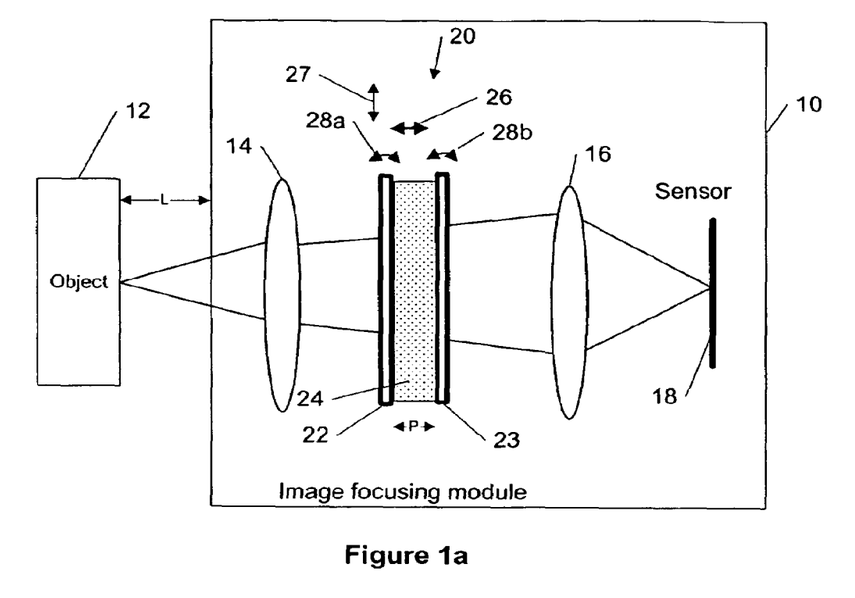
FIGS. 1a and 1b are schematic representations of an image focusing module comprising a hydraulic focusing stabilizer for different distances from an object, according to an embodiment of the present invention.
Figure 1B:
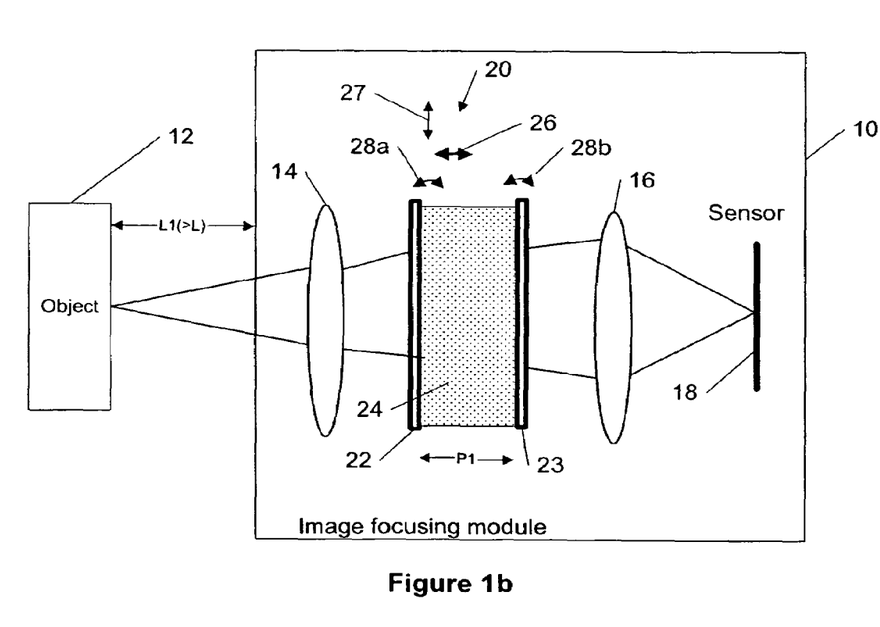

FIGS. 1a and 1b show examples among others of schematic representations of an image focusing module 10 comprising a focusing stabilizer 20 for different distances from an object 12, according to an embodiment of the present invention. The module 10 further comprises an objective lens (or a lens group) 14, for collecting an optical image of the object 12 and a lens or a group of lenses 16 for focusing the optical image after propagating through the focusing stabilizer 20 on a photosensitive surface, such as a sensor 18 (e.g., a charge coupled device). The focusing stabilizer 20 comprises two optical components 22 and 23 with the liquid 24 in between the components 22 and 23, according to the embodiments of the present invention. By adjusting the thickness of the liquid 24 in the direction 26 along the optical axis from the value P in FIG. 1a (with the distance between the object 12 and the module 10 being L) to the value P1, e.g., P1>P, in FIG. 1b, (with the distance between the object 12 and the module 10 being L1, wherein L1>L), the image of the object 12 is focused on the surface of the sensor 18 with a predetermined minimum image quality in both cases shown in FIGS. 1a and 1b.

In addition, the focusing stabilizer 20 can provide the required stabilization, according to an embodiment of the present invention, by moving of at least one element of the optical elements 22 or 23. In one embodiment, this movement can be tilting in the direction 28a and/or 28b of the at least one of the optical elements 22 and 23 relative to an axis perpendicular to the optical axis causing the desired shifting the focused image on the photosensitive surface of the sensor 18. Alternatively, the movement can be moving the at least one of the optical elements 22 and 23 in a direction 27 substantially perpendicular to the optical axis, wherein the at least one element or both elements 22 and 23 have at least one lens-like surface, thus causing the desired shifting of the image on the photosensitive surface of the sensor 18.

Figure 2A:
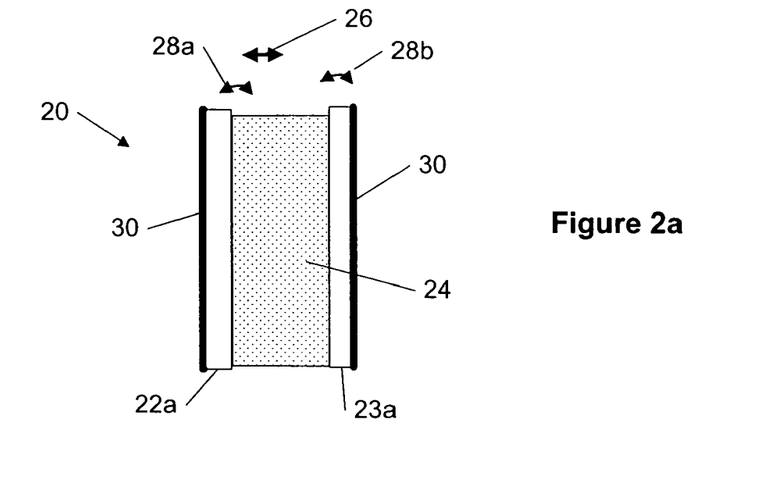
FIGS. 2a, 2b and 2c are schematic representations of a focusing stabilizer: a) with flat optical elements; b) with one flat and one lens optical elements; and c) with lens optical elements, according to an embodiment of the present invention.
Figure 2B:
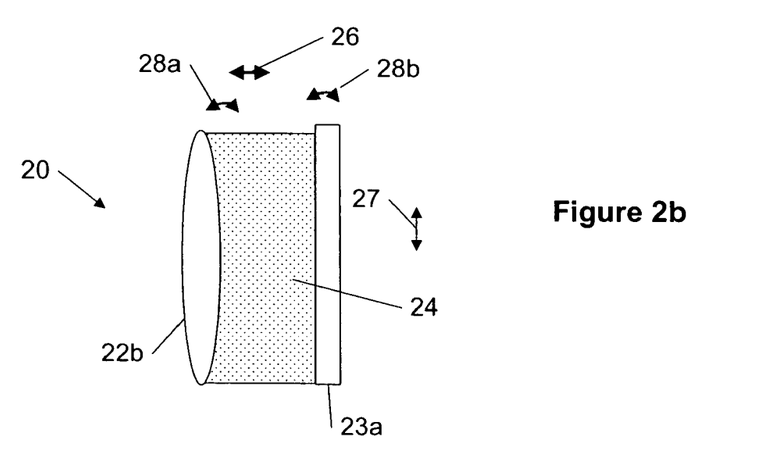
Figure 2C:
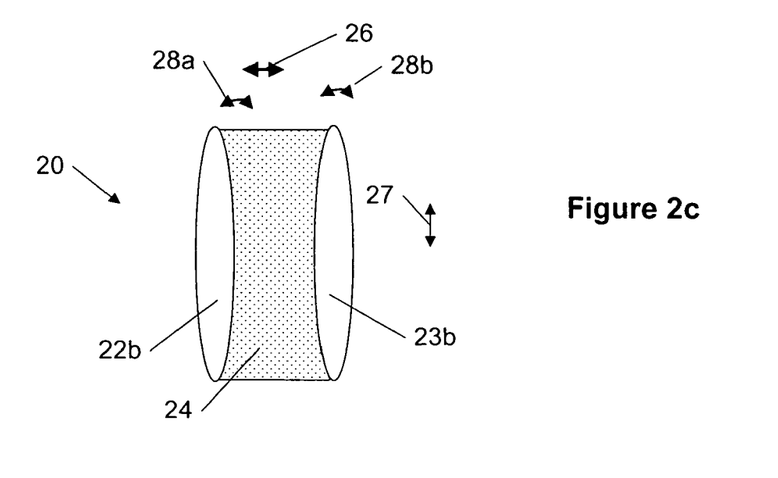

FIGS. 2a, 2b and 2c show further examples among others of schematic representations of a focusing stabilizer 20: a) with flat optical elements 22a and 23a; b) with one flat and one lens optical elements 22b and 23a; and c) with lens optical elements 22b and 23b, according to an embodiment of the present invention. The lens optical elements 22b and 23b can be implemented as any combination of plano-concave-convex surfaces. The flat components 22a and 22b can be implements as flat plates (disks) or prisms. The surfaces exposed to the air can be coated by the antireflection coating 30 as shown, e.g., in FIG. 1a.

In FIG. 2a, the required stabilization can be provided by tilting the flat optical element 22a and/or 23a in the directions 28a and/or 28b as described above. In FIG. 2b, the required stabilization can be provided by tilting the optical element 22b and/or 23a in the directions 28a and/or 28b, or by moving the element 22b, or both element 22b and 23a (e.g., by moving the focusing stabilizer 20) in the direction 27, as explained above. Finally, in FIG. 2c, the required stabilization can be provided by tilting the lens optical element 22b and/or 23b in the directions 28a and/or 28b, or by moving the element 22b, 23b or both (e.g., by moving the focusing stabilizer 20) in the direction 27, as explained above.

FIGS. 3a-3b and 4a-4c show examples using zoom lens design developed for a mobile camera phone. The focusing stabilizer 20 with the liquid between two optical components, according to the embodiment of the present invention, is placed behind the second lens group 16a in a zoom implementation. The focusing stabilizer 20 moves with the second lens group 16a when zooming. The liquid thickness and its refractive index control the focus distance, and the first optical component of the focusing stabilizer 20 is used for the image stabilization.

Figure 3A:
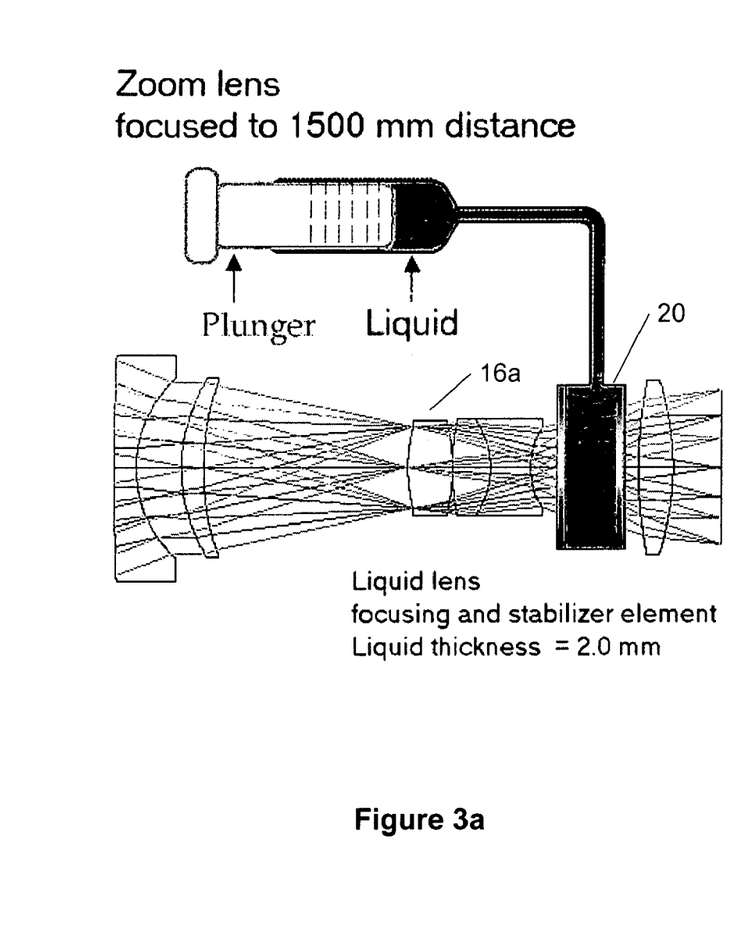
FIGS. 3a and 3b are schematic representations showing hydraulic focusing principle demonstrating how a zoom lens can be focused from a) 1500 mm and b) 150 mm distance from the object, according to an embodiment of the present invention.
Figure 3B:
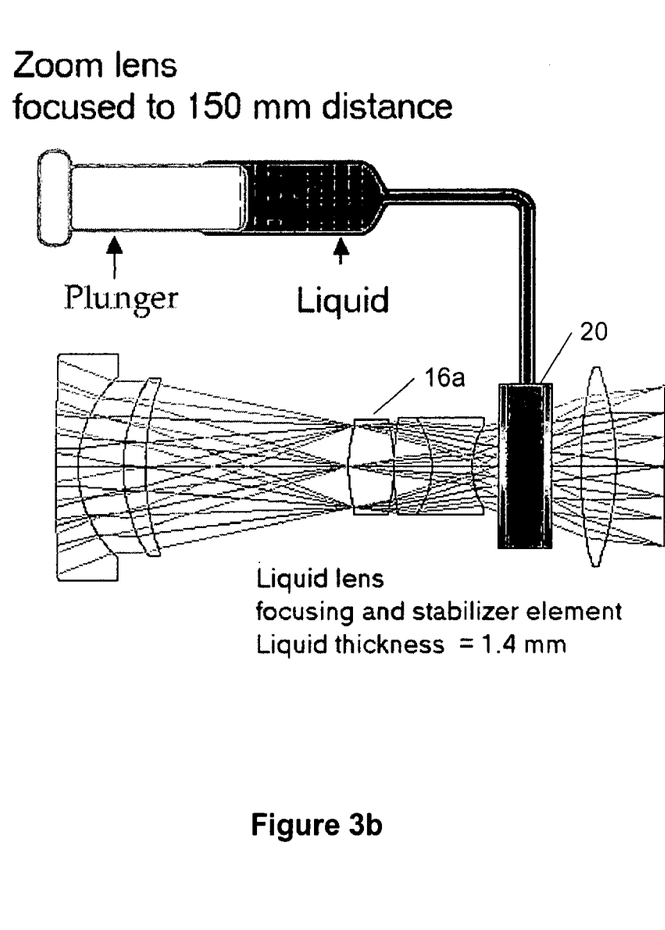

FIGS. 3a and 3b are examples among others of schematic representations showing hydraulic focusing principle demonstrating how a zoom lens can be focused a) from 1500 mm (shown in FIG. 3a) and b) from 150 mm (shown in FIG. 3b) distance from the object using a liquid reservoir and a plunger for creating a required pressure in the liquid and changing its thickness, according to an embodiment of the present invention. In FIG. 3a, the liquid thickness is 2 mm and in FIG. 3b the thickness is 1.4 mm, the zoom is at Wide-position, the focal length is approximately 4.5 mm, the F:number is 2.8, and the diagonal field of view is approximately 64°. The liquid refractive index is of the silicon oil in this example and the liquid is between two 0.3 mm thick BK7-glass plates. Changing focus for the object distance change from 1500 mm to 150 mm corresponds to the liquid thickness change of 0.6 mm.

Figure 4A:
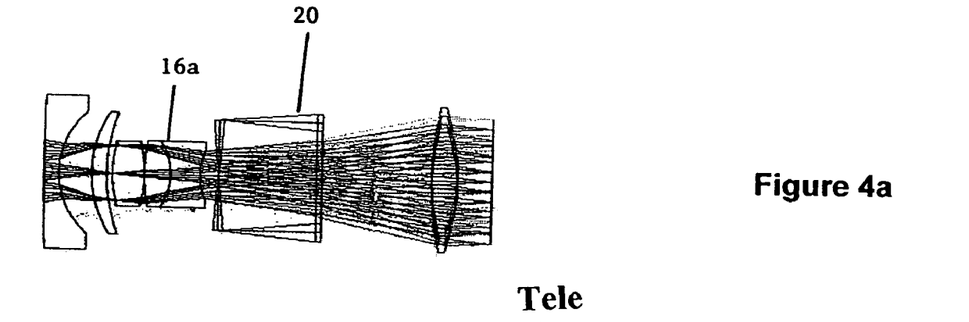
FIGS. 4a, 4b and 4c are schematic representations of simulation results of focusing and stabilizing for zoom lens image stabilization using one surface of a liquid lens tilted by one degree for producing image shift—stabilization for: a) Tele; b) MID and c) Wide zoom positions, according to an embodiment of the present invention.
Figure 4B:
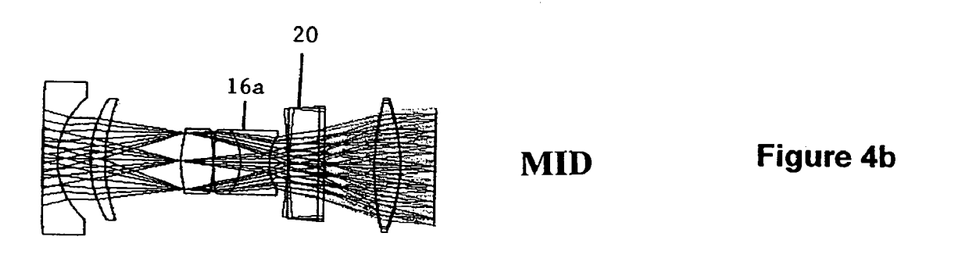
Figure 4C:
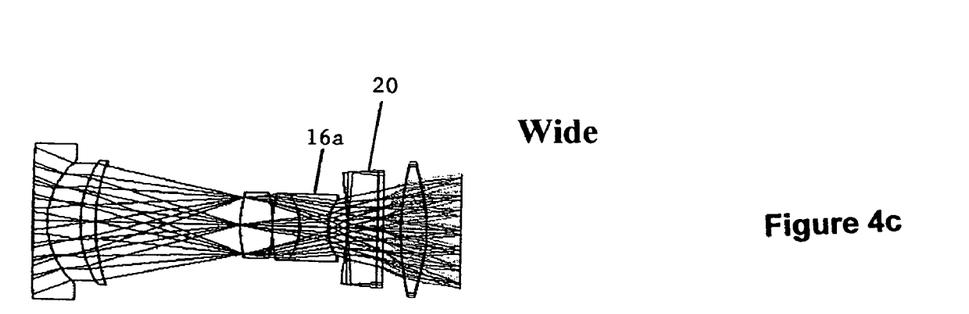

FIGS. 4a, 4b and 4c are schematic representations of simulation results of focusing and stabilizing for zoom lens image stabilization using one surface of a liquid lens tilted by one degree for producing image shift—stabilization for: a) a Tele zoom position as shown in FIG. 4a; b) a MID zoom position as shown in FIG. 4b; and c) a Wide zoom position as shown in FIG. 4c, according to an embodiment of the present invention.

The FIGS. 4a-4c illustrate how effective the image stabilization by hydraulic focusing stabilizer can be. The first optical component of the focusing stabilizer 20 is tilted 1° in these examples to provide the image stabilization, according to the embodiment of the present invention. There are 3 zoom positions in FIGS. 4a-4c, respectively, Wide, Mid and Tele, representing corresponding angular fields of approximately 60°, 40° and 20°. One degree tilt of the first optical component is causing 17 μm, 30 μm and 20 μm image shift, respectively, in the photosensitive surface (sensor) at corresponding zoom positions shown in FIGS. 4a-4c. This image shift can be used to cancel, e.g., a camera rotation which is the main problem why the image stabilization is needed.

Figure 5:
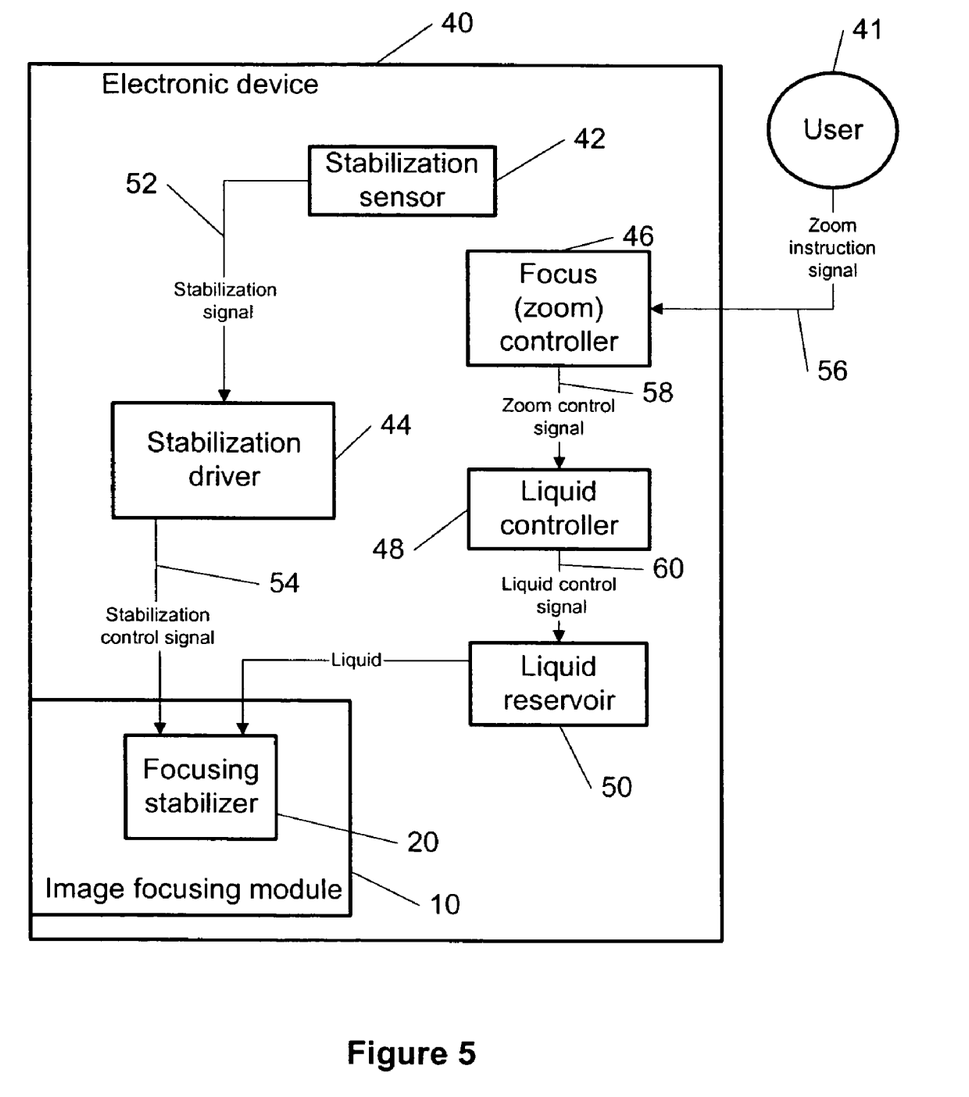
FIG. 5 is a block diagram of an electronic device for providing an optical focusing and stabilizing using a hydraulic focusing stabilizer in an image focusing module, according to an embodiment of the present invention.

FIG. 5 shows an example among others of a block diagram of an electronic device 40 for providing an optical focusing and stabilizing using a focusing stabilizer 20 in an image focusing module 10, according to an embodiment of the present invention. The electronic device 40 further comprises a focus controller 46 (which can include a zoom control function as well), for providing a focus control signal 58 for adjusting said thickness of the liquid. The signal 58 is provided to the liquid controller 48 which generates and provides a liquid control signal to a liquid reservoir 50 which adds or removes the desired amount of liquid to/from the focusing stabilizer 20 for providing the predetermined minimum image quality of the focused image, according to the embodiments of the present invention. The focus controller 46 can operate in an auto-focus and/or auto-zoom mode or it can receive focusing and/or zooming instructions from a user 41.

Moreover, the electronic device 40 still further comprises at least one stabilization sensor 42 monitoring the movement of the electronic device 40 and providing a stabilization signal 52 to at least one stabilization driver 44 which generates and provides a stabilization control signal 54 to the focusing stabilizer 20 for moving the optical components of the focusing stabilizer 20 for providing the desired image stabilization, according to the embodiments of the present invention.

According to an embodiment of the present invention, the block 10, 20, 44, 46 or 48 can be implemented as a software or a hardware block or a combination thereof. Furthermore, the block 10, 20, 44, 46 or 48 can be implemented as a separate block or can be combined with any other standard block of the electronic device 40 or it can be split into several blocks according to their functionality.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A focusing stabilizer, comprising:
    a first optical element, substantially perpendicular to an optical axis;
    a second optical element, substantially perpendicular to said optical axis; and
    a liquid inserted between the first optical element and the second optical element,
    wherein an index of refraction of said liquid is larger than one, and one or both of the first and the second optical elements are configured to move such that to provide a predetermined minimum image quality so that an optical image after being propagated through said focusing stabilizer is focused with said predetermined minimum image quality on a photosensitive surface,
    wherein said predetermined minimum image quality comprises both a focusing or zooming function and a stabilization function, and said stabilization function is provided by tilting at least one element out of the first and the second optical elements relative to an axis perpendicular to the optical axis, or moving at least one element out of the first and the second optical elements in a direction substantially perpendicular to the optical axis, and
    wherein at least one element out of the first and the second optical elements has at least one lens-like surface.

2. The focusing stabilizer of claim 1, wherein at least one element out of the first and the second optical elements is configured to move along said optical axis to adjust a thickness of the liquid along the optical axis for providing said focusing or zooming function.

3. The focusing stabilizer of claim 1, wherein said at least one element out of the first and the second optical elements that is configured to move in a direction substantially perpendicular to said optical axis for providing said stabilization function has at least one lens-like surface.

4. The focusing stabilizer of claim 1, wherein at least one element out of the first and the second optical elements is a plate with flat surfaces or a prism.

5. The focusing stabilizer of claim 1, wherein at least one element out of the first and the second optical elements is coated with antireflection coating.

6. The focusing stabilizer of claim 1, wherein said photosensitive surface is an image sensor or a charge coupled device.

7. The focusing stabilizer of claim 1, wherein said focusing stabilizer is a part of an image focusing module which comprises at least one objective lens or a lens group configured to collect an optical image of an object and to provide said image to the focusing stabilizer, and wherein said image focusing module further comprises at least one further objective lens or a lens group configured to focus said optical image after propagating through said focusing stabilizer on said photosensitive surface.

8. The focusing stabilizer of claim 1, wherein indexes of refraction of said liquid and of said first and second optical elements are substantially equal.

9. A method, comprising:
    propagating an optical image through a focusing stabilizer for further focusing said image on a photosensitive surface with a predetermined minimum image quality, wherein said focusing stabilizer comprises:
    a first optical element, substantially perpendicular to an optical axis;
    a second optical element, substantially perpendicular to said optical axis; and
    a liquid inserted between the first optical element and the second optical element,
    wherein an index of refraction of said liquid is larger than one, and one or both of the first and the second optical elements are configured to move such that to provide said predetermined minimum image quality which comprises both a focusing or zooming function and a stabilization function,
    wherein said stabilization function is provided by tilting at least one element out of the first and the second optical elements relative to an axis perpendicular to the optical axis, or moving at least one element out, of the first and the second optical elements in a direction substantially perpendicular to the optical axis, and
    wherein at least one element out of the first and the second optical elements has at least one lens-like surface.

10. A computer program product comprising a computer readable storage structure embodying computer program code thereon for execution by a computer processor, wherein said computer program code comprises instructions for performing the method of claim 9.

11. The method of claim 9, further comprising:
  collecting said optical image of an object and providing said image to the image stabilizer before said propagating.

12. The method of claim 11, wherein said at least one element out of the first and the second optical elements that is configured to move in a direction substantially perpendicular to said optical axis has at least one lens-like surface.

13. The method of claim 9, wherein at least one element out of the first and the second optical elements is a plate with flat surfaces or a prism.

14. The method of claim 9, wherein said at least one element out of the first and the second optical elements is a prism.

15. The method of claim 9, wherein said photosensitive surface is an image sensor or a charge coupled device.

16. The method of claim 9, wherein at least one element out of the first and the second optical elements is configured to move along said optical axis to adjust a thickness of the liquid along the optical axis for providing said focusing or zooming function.

17. An apparatus, comprising a focusing stabilizer wherein said focusing stabilizer comprises:
  a first optical element, substantially perpendicular to an optical axis;
  a second optical element, substantially perpendicular to said optical axis; and
  a liquid inserted between the first optical element and the second optical element, wherein an index of refraction of said liquid is larger than one, and one or both of the first and the second optical elements are configured to move such that to provide a predetermined minimum image quality so that an optical image after being propagated through said focusing stabilizer is focused with said predetermined minimum image quality on a photosensitive surface,
  wherein said predetermined minimum image quality comprises both a focusing or zooming function and a stabilization function, and said stabilization function is provided by tilting at least one element out of the first and the second optical elements relative to an axis perpendicular to the optical axis, or moving at least one element out of the first and the second optical elements in a direction substantially perpendicular to the optical axis, and
  wherein at least one element out of the first and the second optical elements has at least one lens-like surface.

18. The focusing stabilizer of claim 1, wherein said focusing stabilizer is a part of a photographic camera, a digital camera, a video camera, an electronic imaging device, a portable device, a mobile electronic device or a camera-phone.

19. The apparatus of claim 17, further comprising:
  at least one focus controller, configured to provide a focus/zoom control signal.

20. The apparatus of claim 19, wherein, in response to said focus/zoom control signal, at least one element out of the first and the second optical elements is configured to move along said optical axis for providing said focusing or zooming function.

21. The apparatus of claim 17, further comprising:
  at least one stabilization sensor, configured to monitor the movement of the apparatus and to provide a stabilization signal; and
  at least one stabilization driver, responsive to said stabilization signal, configured to provide a stabilization control signal to the focusing stabilizer.

22. The apparatus of claim 21, wherein, in response to said stabilization control signal, at least one element out of the first and the second optical element is configured to tilt relative to an axis perpendicular to the optical axis for providing said stabilization function.

23. The apparatus of claim 21, wherein, in response to said stabilization control signal, at least one element out of the first and the second optical elements is configured to move in a direction substantially perpendicular to said optical axis for providing said stabilization function, wherein said at least one element has at least one lens-like surface.

24. The apparatus of claim 17, wherein at least one element out of the first and the second optical elements is a plate with flat surfaces or a prism.

25. The apparatus of claim 17, wherein at least one element out of the first and the second optical elements is coated with antireflection coating.

26. The apparatus of claim 17, wherein said photosensitive surface is an image sensor or a charge coupled device.

27. The apparatus of claim 17, further comprising:
  at least one objective lens or a lens group configured to collect an optical image of an object and to provide said image to the image stabilizer; and
  at least one further objective lens or a lens group configured to focus said optical image after propagating through said image stabilizer on said photosensitive surface.

28. The apparatus of claim 17, wherein indexes of refraction of said liquid and of said first and second optical elements are substantially equal.

\* \* \* \* \*

UNITED STATES PATENT AND TRADEMARK OFFICE
CERTIFICATE OF CORRECTION

| | | |
|---|---|---|
| PATENT NO. | : 7,627,236 B2 | Page 1 of 1 |
| APPLICATION NO. | : 11/360985 | |
| DATED | : December 1, 2009 | |
| INVENTOR(S) | : Kai Markus Ojala | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 653 days.

Signed and Sealed this

Twenty-first Day of December, 2010

David J. Kappos
*Director of the United States Patent and Trademark Office*